United States Patent

Sifri et al.

[15] 3,653,670
[45] Apr. 4, 1972

[54] SPRING-LOADED SEAL WITH SYMMETRICAL CROSS SECTION

[72] Inventors: Elie C. Sifri; Steve W. H. Wu, both of Portland, Oreg.

[73] Assignee: Cascade Corporation, Portland, Oreg.

[22] Filed: May 11, 1970

[21] Appl. No.: 36,292

[52] U.S. Cl. ............................................. 277/164, 277/205
[51] Int. Cl. ........................................................ F16j 15/32
[58] Field of Search .................... 277/153, 164, 205, 237, 165

[56] References Cited

UNITED STATES PATENTS 3,223,426  12/1965  Reid ........................................ 277/153

FOREIGN PATENTS OR APPLICATIONS 1,023,210  12/1952  France .................................... 277/237
858,621  7/1949  Germany ................................ 277/153

*Primary Examiner*—Robert I. Smith
*Attorney*—Kolisch & Hartwell

[57] ABSTRACT

A sealing assembly forming a fluid tight seal between a first member having a cylindrical bore therein and a second member having a portion of circular cross section disposed within the bore and movable axially relative to the first member. The assembly includes an elastomeric annular body with inner and outer sealing edges in sealing contact with the cylindrical bore and with the portion of circular cross section. An annular helical spring is disposed within said body, and such spring is under stress in a direction extending circumferentially on the sealing assembly. This stress of the spring operates continuously to force on of the sealing edges into firm contact with the member that the edge contacts. This one sealing edge forms a dynamic seal in the construction, and the other sealing edge forms a static seal in the construction.

2 Claims, 5 Drawing Figures

PATENTED APR 4 1972 3,653,670
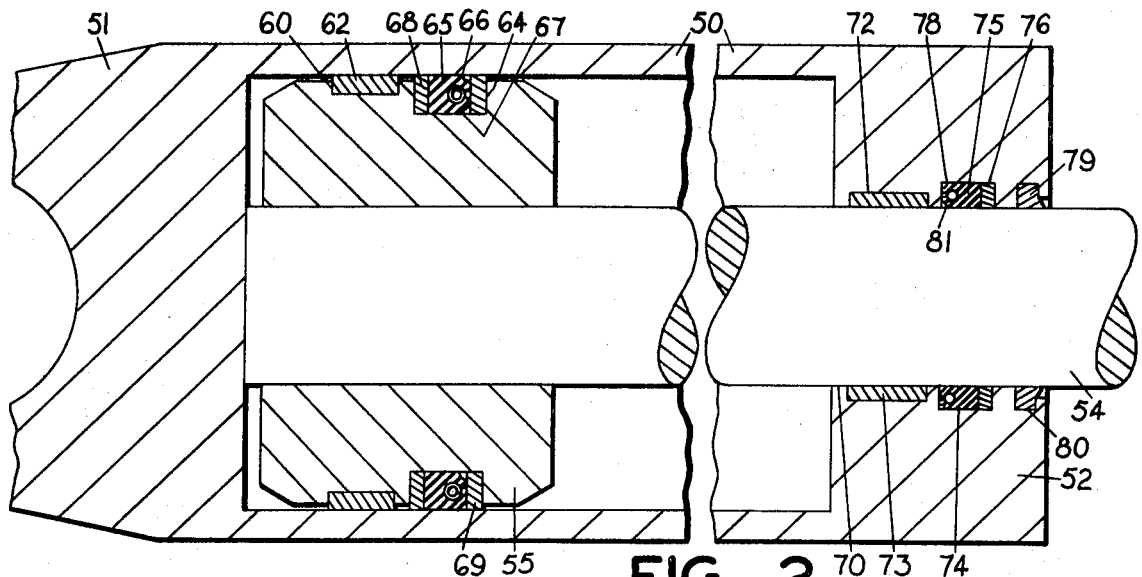
FIG. 1    FIG. 2
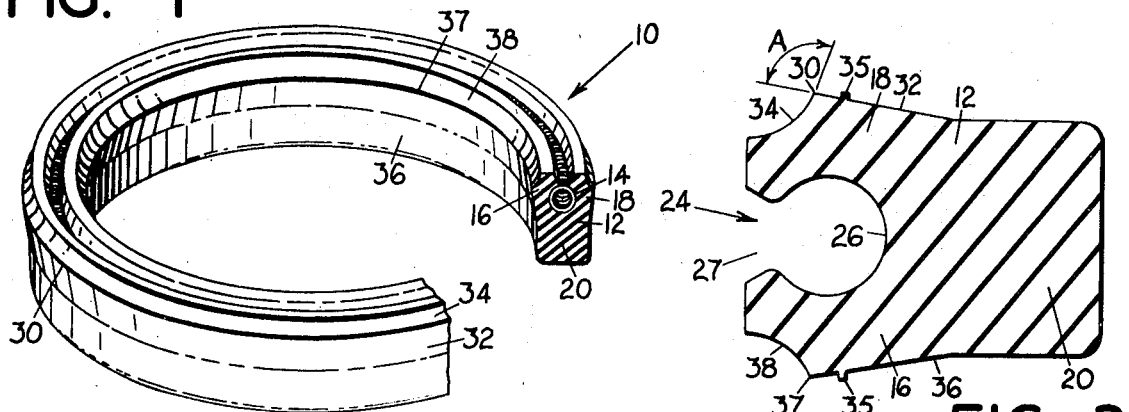
FIG. 3
FIG. 4
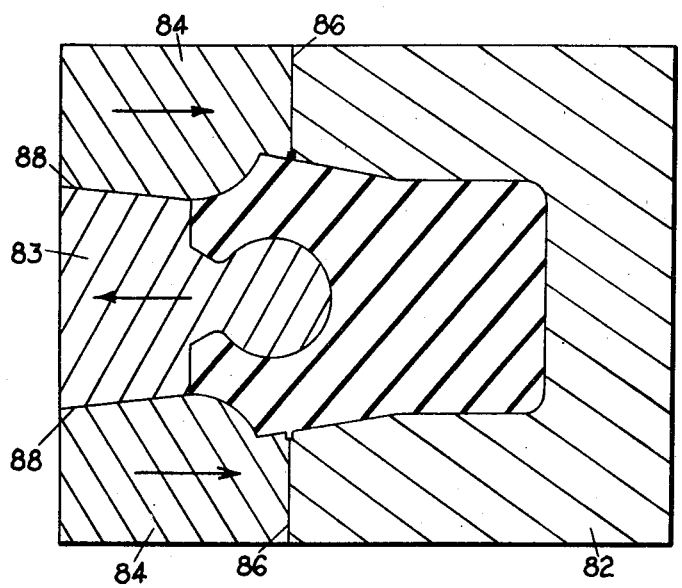
FIG. 5
ELIE C. SIFRI
STEVE W.H. WU
INVENTORS.
BY Kolisch + Hartwell
ATTY.

3,653,670

1

SPRING-LOADED SEAL WITH SYMMETRICAL CROSS SECTION

BACKGROUND OF THE INVENTION

The present invention concerns a spring-loaded, U-cup seal adapted to form a dynamic seal between relatively reciprocating members such as a piston and cylinder.

The use of U-cup sealing rings to form pressure seals between reciprocating parts such as a piston and cylinder is well-known. Among other requirements, an effective dynamic sealing element used in a hydraulic ram should maintain at least the required minimum sealing pressure and should be easily installed. Furthermore, the sealing element should be durable and include means of compensation for wear to permit satisfactory operation over a satisfactory number of cycles. Also, the sealing element should be fabricated of suitable material and in a satisfactory configuration to resist extrusion, during operation, into the normal clearances that exist between the movable surfaces confining the seal.

A number of seal configurations exist in the prior art which were designed to satisfy the above requirements. However, there is a continuing need for dynamic sealing means which are more economical to manufacture and which have an extended operating life. Furthermore, there is a need in the art for an annular sealing member which can be used to form a dynamic seal along the outside surface of the seal or, alternatively, along the inside surface of the seal.

SUMMARY OF THE INVENTION

Accordingly, it is an object of the invention to provide an improved U-cup seal of annular configuration that is spring loaded.

It is another object of the invention to provide such a seal having a sealing edge oriented directly over an annular spring to receive the maximum force of the spring.

It is a further object of the invention to provide a U-cup seal having a circumferential periphery featuring a sealing edge formed at the juncture of two inclined surfaces that define an internal angle of intersection of nearly 90°.

It is yet another object of the invention to provide such a U-cup seal having a symmetrical cross section with two sealing edges that can be used to form a dynamic seal on the outer circumferential periphery of the seal, or on the inner circumferential periphery of the seal.

It is yet a further object of the invention to provide an annular U-cup seal which includes inner and outer skirts joined by a radially extending base wall to define an open internal channel between the skirts adapted to nearly enclose an annular helical spring.

Finally, it is yet an object of the invention to provide an annular U-cup seal of molded urethane having mold parting lines offset from the sealing edges so that no edge finishing operation is required.

These and other objects of the invention are attained in a seal configuration that includes an annular U-cup member of symmetrical cross section comprising an inner skirt and an outer skirt joined by a radially extending base wall. A first sealing edge is formed on the outer side of the outer skirt at the juncture of two inclined surfaces that define an internal angle of intersection of nearly 90°. The edge defined by the inclined surfaces remains sharp even as the sealing edge wears. A similar, symmetrical sealing edge is formed on the inner side of the inner skirt. The skirts and base wall surround an open annular, inner channel which includes a portion of generally circular cross section and a neck portion connecting the portion of circular cross section with the front of the seal. The portion of circular cross section of the channel is adapted to envelop an annular helical spring and position the latter between the sealing edges defined on the inner and outer skirts.

2

BRIEF DESCRIPTION OF THE DRAWINGS

Other objects and advantages of the invention will become apparent from the following detailed description of the invention taken in conjunction with the accompanying drawings, wherein:

FIG. 1 is an enlarged perspective view, partially cut away for purposes of illustration, of a sealing ring constructed in accordance with one embodiment of the invention;

FIG. 2 is a right elevation view, in partial section, of a piston and cylinder arrangement illustrating two types of installation of the sealing ring shown in FIG. 1;

FIG. 3 is an enlarged view of the cross-sectional outline of the seal in FIG. 1 with the spring removed;

FIG. 4 is an enlarged view of the cross-sectional outline of the seal in FIG. 1 with a compressed spring retained therein; and FIG. 5 is an enlarged view of the cross-sectional outline of the seal in FIG. 1 in relationship to a three part mold.

DETAILED DESCRIPTION OF THE INVENTION

Referring now to FIGS. 1–5, one preferred embodiment of the invention is illustrated comprising a sealing ring generally indicated at 10. The ring includes an annular body 12 and a helical coil spring or garter spring 14 confined therein. The body includes an annular inner skirt 16 and an annular outer skirt 18 joined together by a radially extending annular base wall 20. Between the skirts there is defined an open, internal channel 24 including a first portion 26 of generally circular cross section and a neck portion 27 connecting portion 26 with the front of body 12.

Surfaces 32 and 34 bound the radially outer side of the outer skirt and form the outer circumferential periphery of the seal. A sealing edge 30 is provided on the outer periphery of the seal which is defined by the intersection of inclined surface 32 and inclined surface 34. As shown, the intersecting surfaces define an internal angle A of nearly 90°.

This ensures that edge 30 is sharply defined to form an effective seal when in contact with a mating surface. It should be noted that the outline of surface 34 describes an arc of mild radius. The formation of such a concave surface tends to accentuate the sharpness of the intersection. However, surfaces 32 and 34 can be of any suitable outline so long as the sealing edge remains sharp. In this regard it should be noted that if the internal angle exceeds 110°, edge 30 will not be satisfactorily defined. Surface 32 can terminate intermediate the width of the outer skirt, as illustrated, or can extend to the back of the base wall.

A mold parting line, or flash 35 is illustrated on the surface of the outer skirt, removed from the sealing edge. In the preferred embodiment the parting line is spaced 0.040 inch from edge 30. While this distance can be varied, it is necessary that the spacing between the parting line and edge 30 exceed the height of the parting line so that the parting line does not interfere with the formation of an effective seal even if it is folded over towards edge 30. Other considerations in the placement of the parting line are explained hereinafter.

An identical sealing edge 37 is formed on the inner side of the inner skirt along the intersection of inclined surface 36 and inclined surface 38. As shown, the inner and outer skirts and the sealing edges thereon are of similar configuration and are joined together in symmetrical fashion by base wall 20.

Annular spring 14 is lodged almost entirely within portion 26 of the inner channel. The body of the spring backs up and supports the two skirts on either side thereof, which are spread slightly apart from the position that they have when in a relaxed state by the insertion of the spring. This is illustrated best in FIG. 4, where the outline of the seal indicated in phantom shows the skirts as they are when in a relaxed state.

With the U-cup seal described, either the inner circumferential periphery or the outer circumferential periphery of the seal can be utilized in the production of a dynamic seal. In functioning as a dynamic seal, the periphery is made capable of shifting radially to compensate for the wear that occurs after cycling of the relatively movable parts being sealed together.

Further explaining, a spring 14, which is under compression in a direction extending circumferentially on the seal, is utilized to form a dynamic seal on the outer periphery of the seal. The compressed seal wants to enlarge in a direction extending circumferentially of the seal, and thus exerts a radially outwardly directed bias against the outer skirt. On the other hand, if the spring is under tension in a direction extending circumferentially on the seal, the spring wants to shorten in a direction extending circumferentially of the seal. This results in a radially inwardly directed bias exerted on the inner skirt, whereby a dynamic seal is formed on the inner periphery of the seal. The positioning of the spring directly in line with the sealing edges ensures that the full amount of force of the spring is transmitted to the sealing edges. It should be noted that in ordinary practice the spring would have its ends secured together.

The body 12 of the seal is preferably comprised of a moldable elastomeric substance such as polyurethane. A suitable polyurethane is manufactured by Mobay Chemical Company under the trade name "Texan." However, other elastomeric materials can be used as well.

The spring 14, preferably comprises a helical coil, however, other equivalent means are equally usable, so long as the desired circumferential tension or compression is maintained in the spring member. Since oil can pass freely around the spring, the latter has no tendency to trap pressure or to be extruded from the inner channel, as could happen with an O-ring, for example.

Referring now to FIG. 2, the described embodiment of the seal is shown installed at the left hand side of the figure to form a dynamic outer seal, and at the right hand side of the figure to form a dynamic inner seal. A hydraulic ram is illustrated including cylinder 50 having end walls 51, 52 arranged in conventional reciprocal relationship with a shaft 54 carrying a piston 55. A working tolerance of approximately 0.040 inch is provided between the outside diameter of the piston and the inside diameter of the cylinder. Consequently, for the usual purposes of operation, a low pressure (in order of 1,000 psi) dynamic seal is necessary between the piston and the cylinder.

As shown, the outside diameter of the piston includes a first groove 60 and a second groove 64 formed therein. An annular nonmetallic bearing 62 of conventional design is seated in groove 60; and a seal similar to that illustrated in FIG. 1 is seated in groove 64. The seal is confined between a pair of back-up rings 68, 69. The back-up rings comprise annular nylon rings that can be split, if desired to facilitate installation. The rings serve to prevent extrusion of the sealing member into the space between the cylinders and piston whereby the life of the seal is prolonged. By inhibiting extrusion of the seal the back-up rings permit the use of a larger operating tolerance between the piston and cylinder of the hydraulic ram. By including a pair of opposed back-up rings on opposite sides of the seal, the seal can be used, effectively, with hydraulic rams designed for double-acting applications.

The seal is shown with the base wall oriented to the left in FIG. 2. However, it should be realized that this installation could be reversed. With the seal positioned as shown, a dynamic seal is formed by sealing edge 66 at the wall of the cylinder and a static seal is formed by sealing edge 67 at the base of groove 64 of the piston. The spring in the seal is under compression in a direction extending circumferentially of the seal, so that the outer sealing edge is maintained in contact with the cylinder wall under satisfactory pressure.

At the right end of the figure, shaft 54 is reciprocal within a race 70 formed in the end wall of the cylinder. A working tolerance of approximately 0.040 inch is again provided between the outside diameter of the shaft and the inside diameter of the race. This tolerance is closed by a sealing means similar to that illustrated in FIG. 1.

More specifically, a groove 72 is formed in the periphery of the inner surface of the race, having a nonmetallic bearing 73 seated therein between the shaft and the end wall. Another groove 74 is formed in the periphery of the race, having a sealing member 75 seated therein of a design similar to the sealing ring illustrated in FIG. 1. The sealing ring is oriented with its base portion to the right, although the position could be reversed without departing from the scope of the invention. A single nylon back-up ring 76 is provided at the end of the sealing member for the same purpose as rings 68, 69. A conventional grease ring 79 is secured within a groove 80 formed at the outer end of race 70.

In the configuration shown, the sealing edge 78 of the ring forms a static seal at its point of contact with the bottom surface of groove 74, and sealing edge 81 forms a dynamic seal at its point of contact with the bottom surface of groove 74, and sealing edge 81 forms a dynamic seal at its point of contact with the surface of shaft 54. Accordingly, a tensioned spring is provided whereby the circumferential tension of the spring continually urges the inner sealing edge into contact with the surface of the shaft in the manner previously described.

Referring now to FIG. 5 is suitable mold is illustrated for forming a seal having an outline as illustrated in FIGS. 1–4. The mold includes a base portion 82 surrounding the base of the seal, a center portion 83 adapted to form the inner channel, and a dual ring portion 84 surrounding portion 83. Mold parting lines 86, 88 are shown between the respective portions of the mold.

The base portion 82 is carried upon a chuck, not shown, adapted for movement to the right in FIG. 5; and the center portion 83 and ring portion 84 are carried by another chuck, not shown, adapted for movement to the left in FIG. 5. Ring portion 84 is also reciprocable with respect to center portion 83 as shown by the arrows, when both elements are removed from the base portion of the mold.

In operation the mold is closed and liquid material is extruded into the mold under pressure through openings, not shown, in base portion 82. Air escapes from the mold along the parting lines and the mold is entirely filled. After a short initial curing interval, base portion 82 is removed to the right, being easily stripped from the seal. Ring portion 84 is then moved reciprocally with respect to center portion 83 by means not shown. This movement serves to extrude the skirts of the seal sufficient to strip the seal from the center portion. The operator then removes the seal from ring 83 by hand and closes the mold for reuse.

Parting lines 86 must be placed sufficiently close to the corners forming the sealing edges to ensure that the mold will fill entirely. However, as previously mentioned, the parting lines must be sufficiently spaced from the sealing edges so that the height of the flash or parting lines on the seal cannot interfere with the sealing edge. This relationship is essential so that an additional finishing step does not have to be performed upon the seal to remove the flash.

It is claimed and desired to secure by Letters Patent:

1. A sealing assembly forming a fluid seal between a first member having a cylindrical bore formed therein and a second member having at least a portion of circular cross section disposed within said bore, the two members being relatively axially movable, said sealing assembly including an annular body of elastomeric material having inner and outer sealing edges thereon disposed, respectively, in contact with said cylindrical bore of the first member and with said portion of circular cross section of said second member; and an annular helical spring having a substantially circular cross section disposed within said body under stress extending circumferentially of the sealing assembly, said stress operating to force one of said sealing edges into firm contact with the member that the edge contacts, the member contacted by said one of said sealing edges sliding on said one edge with relative movement of said members, the other of said sealing edges having a static position on the member that it contacts.

2. In combination with a pair of coaxial circumferential surfaces that are relatively movable in an axial direction, a sealing assembly interposed between said surfaces, said sealing assembly comprising an annular body of elastomeric material having an annular base wall normal to said surfaces and inner and outer annular skirts joined to said base wall adjacent inner and outer perimeters of the wall, said skirts extending in an axial direction in the assembly from the base wall, and defining between them a hollow internal channel, the outer skirt being bounded by an outer side which forms the outer circumferential periphery of the sealing assembly and which is adjacent the outer one of said pair of circumferential surfaces, the inner skirt being bounded by an inner side which forms the inner circumferential periphery of the sealing assembly and which is adjacent the inner one of said circumferential surfaces, at least one of said sides in the sealing assembly including a surface portion which is inclined with respect to the axis of the seal and terminates in a sealing edge, said sealing edge being in sliding contact with the circumferential surface thereadjacent thus to form a dynamic seal in the assembly, the other side of the sealing assembly occupying a static position on the circumferential surface thereadjacent, and an annular helical spring lodged within said channel with the body of the spring providing support for the two skirts on either side thereof, said spring being under stress in a direction extending circumferentially of the sealing assembly and exerting by reason of such stress a radially directed force against said sealing edge which forms the dynamic seal.

\* \* \* \* \*